United States Patent [19]

Morita et al.

[11] 4,405,687

[45] Sep. 20, 1983

[54] POLYBOROSILOXANE COMPOSITION FOR PRODUCTION OF ELECTRICALLY INSULATING LAYER AND INSULATED ELECTRIC WIRE USING THE COMPOSITION

[75] Inventors: Minoru Morita; Etsuo Hosokawa; Kohzoh Arahara, all of Yokohama, Japan

[73] Assignee: Showa Electric Wire & Cable Co., Ltd., Japan

[21] Appl. No.: 367,025

[22] Filed: Apr. 9, 1982

[30] Foreign Application Priority Data

Apr. 13, 1981 [JP] Japan ................................. 56-54359
Jun. 2, 1981 [JP] Japan ................................. 56-84667
Jun. 30, 1981 [JP] Japan ................................. 56-102044
Jul. 17, 1981 [JP] Japan ................................. 56-112695

[51] Int. Cl.³ ..................... B32B 27/12; H01B 3/46; H01B 17/62
[52] U.S. Cl. ..................... 428/383; 174/110 SR; 174/110 N; 174/110 D; 174/110 S; 174/110 E; 427/117; 427/118; 428/390; 428/391; 525/389; 528/4; 528/5; 528/8
[58] Field of Search ..................... 525/389, 431, 477; 528/4, 5, 8; 428/383, 390, 391; 427/117, 118; 174/110 SR, 110 N, 110 D, 110 S, 110 E

[56] References Cited

U.S. PATENT DOCUMENTS

| | | | |
|---|---|---|---|
| 3,213,136 | 10/1965 | Washburn et al. | 528/5 |
| 4,152,509 | 5/1979 | Yojima et al. | 528/4 |
| 4,208,492 | 6/1980 | Hedoya et al. | 528/5 |
| 4,229,560 | 10/1980 | Chernikhov et al. | 528/4 |
| 4,267,210 | 5/1981 | Yajima et al. | 428/429 |

FOREIGN PATENT DOCUMENTS 2355858  5/1974  Fed. Rep. of Germany ...... 525/431

*Primary Examiner*—James C. Cannon
*Attorney, Agent, or Firm*—Finnegan, Henderson, Farabow, Garrett & Dunner

[57] ABSTRACT

A polyborosiloxane composition to be used for the formation of an insulating layer on an electric conductor comprises (A) a polyborosiloxane produced by the reaction of boric acid, a boric acid derivative, or a halogenated boron with a silane compound and a silicone oil, (B) a silicone resin or a synthetic resin having a nitrogen-containing heterocyclic ring in the molecule, (C) an inorganic filler, and (D) a common solvent for (A) and (B). An insulated electric wire excellent in thermal resistance is obtained by applying the composition to an electric conductor and baking the applied layer of the composition.

6 Claims, No Drawings

POLYBOROSILOXANE COMPOSITION FOR PRODUCTION OF ELECTRICALLY INSULATING LAYER AND INSULATED ELECTRIC WIRE USING THE COMPOSITION

BACKGROUND OF THE INVENTION

1. Field of the Invention

This invention relates to a composition formed preponderantly of a polyborosiloxane and used for the production of an electrically insulating layer and to an enameled wire using the composition.

2. Description of the Prior Art

Polyborosiloxanes which have the main claim of boron, silicon and oxygen have been known as semi-inorganic polymers.

These polyborosiloxanes include a compound obtained by the reaction of boric acid, a derivative thereof, and phenylsilane (U.S. Pat. No. 4,152,509) and a compound produced by the reaction of dichlorosilane with an aliphatic alcohol, an aromatic alcohol, a phenol, or an aromatic carboxylic acid (U.S. Pat. No. 4,342,487). And a method which comprises coating the surface of a metallic substrate with such a polyborosiloxane and subjecting the formed layer to a thermal treatment (U.S. Pat. No. 4,267,210) has been also known to the art.

These known polyborosiloxanes invariably are hardly soluble in solvents capable of being baked, fail to form layers on metallic surfaces after they are baked and, if allowed to form layers, the layers are deficient in flexibility and intimate adhesiveness to metallic surfaces. Thus, they fall short of effectively serving as electrically insulating coating compositions. In the circumstance, no electrically insulating layer using a semi-inorganic polymer has ever been materialized.

SUMMARY OF THE INVENTION

The first object of this invention, therefore, is to provide a composition formed preponderantly of a polyborosiloxane and used for the production of an electrically insulating layer on a conductor surface, which composition is soluble in ordinary solvents and is capable of producing on the conductor surface a layer excelling in flexibility and mechanical strength and adheres fast to the conductor surface.

The second object of this invention is to provide an insulated electric wire possessed of an insulating layer of the aforementioned polyborosiloxane which is excellent in resistance to heat, electrical insulating property, and mechanical properties.

These objects of the present invention are accomplished by a thermally resistant resinous composition for the production of an electrically insulating layer on a conductor surface, which composition comprises:

(A) a polyborosiloxane obtained by the polycondensation reaction at a temperature of 50° to 800° C. of (1) at least one boron compound selected from the group consisting of boric acids, boric anhydride, metallic salts of boric acid, halogenated borons, and boric esters, (2) at least one silane compound selected from the group consisting of silane compounds represented by the general formulas, $SiX_4$, $SiRX_3$, and $SiRR'X_2$ (wherein, R and R' each denote a methyl group or a phenyl group, and X denotes a hydroxyl group (providing that, in $SiX_4$, at least one of the X's is a halogen atom), or a halogen atom, providing that where X is a hydroxyl group, a dehydration condensate is embraced), and (3) at least one silicone oil selected from the group consisting of dimethyl silicone oil and phenyl methyl silicone oil having a viscosity of at least 1.0 centistock at 25° C., (B) at least one thermally resistant synthetic resin selected from the group consisting of silicone resins and synthetic resins containing a nitrogen-containing heterocyclic ring, (C) an inorganic filler, and (D) a common solvent for (A) the polyborosiloxane and (B) the thermally resistant synthetic resin.

DETAILED DESCRIPTION OF THE INVENTION

In the group of boron compounds of (1) under (A), boric acids are represented by orthoboric acid and metaboric acid, metallic salts of boric acid by borax, halogenated borons by boron chloride, and boric esters by methyl borate.

The group of silane compounds of (2) under (A) includes methyltrihydroxysilane, phenyltrihydroxysilane, dimethyldihydroxysilane, diphenyldihydroxysilane, methylphenyldihydroxysilane, and dehydration condensates thereof, tetrachlorosilane, methyltrichlorosilane, phenyltrichlorosilane, dimethyldichlorosilane, diphenyldichlorosilane, and methylphenyldichlorosilane. It is, however, desirable to use hydroxy silanes, because chlorine-containing silanes produce hydrogen chloride, a compound detrimental to a work environment, during their synthesis.

In the group of silicone oils of (3) under (A), those having at least 1.0 centistoke, preferably at least 10 centistokes, of viscosity are proper in the sense of improving the degree of polymerization. Dimethyl silicone, methylphenyl silicone, or a mixture thereof can be used insofar as the requirement just mentioned is satisfied.

The group of silicone resins under (B) include modified silicone resins such as silicone alkyd, silicone polyester, silicone acryl, silicone epoxy, and silicone urethane besides homopolymers of silicone.

Examples of the thermally resistant synthetic resins which have a nitrogen-containing heterocyclic ring in the molecule include copolymers having an imide ring and imidazopyrrolone ring in the molecule besides imide ring-containing and imidazopyrrolone ring-containing synthetic resins such as polyimide, polyamideimide, and polyimidazopyrrolone.

Of these synthetic resins, those which use an aromatic component as an amine and an acid of the starting component excel in thermal resistance and, therefore, are suitable for this invention.

If the thermally resistant synthetic resin is such that it is soluble in the common solvent in the state of its precursor, a polyamide acid, then the corresponding polyamide acid is used instead.

The silicone resins and the resins having a nitrogen-containing heterocyclic ring in the molecule may be used either independently of one another or in combination with one another.

The group of inorganic fillers under (C) include clayish minerals such as glass, asbestos, kaolinite, and montmorillonite, mica, talc, aluminum oxide, boron oxide, zirconium oxide, lead oxide, zinc oxide, magnesium oxide, tungsten carbide, titanium carbide, molybdenum carbide, silicon carbide, zirconia titan, nitro-silicon, nitro-boron, borin nitride, sodium aluminate, potassium titanate, potassium silicate, aluminum silicate, magnesium silicate, zinc silicate, zirconium silicate, titanium silicate, calcium aluminum silicate, lithium aluminum silicate, and ceramic flint having several metal oxides mixed and fused. They may be equally effectively used either independently of one another or in combination with one another. These inorganic fillers may be natural products or synthetic products. In any event, they are desired to be used in the form of a finely divided powder having a particle diameter of not more than 10μ.

Examples of the solvent under (d) include phenolic solvents such as phenol, cresol, and xylenol and polar solvents such as N-methyl-2-pyrolidone and dimethyl acetamide. Generally, since the polyborosiloxane under (A) is soluble in all solvents, it is desirable to use a good solvent for the thermally resistant synthetic resin under (B). The blending ratio of the boron compound of (1) and the silane compound of (2) under (A) is desired to fall in the range of 10:1 to 1:10, preferably 5:1 to 1:5, in the B:Si atomic ratio.

The amount of the silicone oil of (3) under (A) is in the range of 5 to 100 parts by weight based on 100 parts by weight of the boron compound of (1) and the silane compound of (2) combined.

When the components of (1) through (3) mentioned above are mixed and allowed to react with the compounds enumerated below, the polyborosiloxane resin to be produced enjoys further enhancement in flexibility and resistance to water.

(a) Aromatic alcohols, aliphatic polyhydric alcohols, phenols, and aromatic carboxylic acids.
(b) A mixture of organic salts of lead, manganese, cobalt, zinc, and calcium.
(c) Nitrogen-containing compounds such as triethanol amine, monoethanol amine, diethanol amine, phenylene diamine, ethylene diamine, trimethylene diamine, diaminodiphenyl ether, and diaminodiphenyl methane.

As regards the blending ratios of the components (a) through (c), that of the component of (a) is desired to fall in the range of 5 to 30 parts by weight and that of the component of (b) in the range of 0.05 to 10 parts by weight respectively based on 100 parts by weight of the boron compound of (1) and the silane compound of (2) combined, while that of the component of (c) is desired to be such that the total of N atoms thereof falls in the range of 5 to 200 per 100 B atoms in the boron compound of (1). The aforementioned components (a) through (c) may be used either singly or in the form of a mixture of at least two members.

The polyborosiloxane under (A) is obtained by subjecting the aforementioned components to polycondensation at temperatures of 50° to 800° C. optionally in the present of a solvent and a catalyst. When this reaction is carried out at temperatures exceeding 300° C., it is desired to be performed under an inert atmosphere. Optionally, the polycondensation may be performed in two separate steps, i.e., in the first step, the components may be subjected to polycondensation at 50° to 200° C. and the reaction mixture is freed from unaltered reactants and solvent by filtration and, in the second step, the reaction mixture is subjected to further polycondensation at temperatures in the range of 100° to 700° C.

The polyborosiloxane obtained as described above in soluble in such solvents as cresol, N-methyl-2-pyrolidone, and tetrahydrofuran.

The composition of the present invention is obtained by mixing a solution of the polyborosiloxane of (A) obtained as described above with a solution of the thermally resistant synthetic resin of (B) and the inorganic filler of (C).

The inorganic filler of (C) may be added to the molten resin of the freshly synthesized polyborosiloxane of (A).

As regards the blending ratios of the thermally resistant synthetic resin of (B) and the inorganic filler of (C) with the polyborosiloxane of (A), that of the thermally resistant synthetic resin is in the range of 5 to 300 parts by weight, preferably 10 to 200 parts by weight based on 100 parts by weight of the polyborosiloxane and that of the inorganic filler is in the range of 5 to 200 parts by weight, preferably 10 to 100 parts by weight based on 100 parts by weight of the polyborosiloxane of (A) and the thermally resistant synthetic resin of (B) combined.

If the blending ratio of the thermally resistant synthetic resin is less than 5 parts by weight, the baked layer is deficient in flexibility and resistance to hydrolysis. If it exceeds 300 parts by weight, the outstanding thermal resistance of the polyborosiloxane resin is sacrificed and the thermally resistant synthetic resin is deficient in mechanical properties at temperatures exceeding the decomposition temperature.

If the blending ratio of the inorganic filler is less than 5 parts by weight based on 100 parts by weight of the polyborosiloxane of (A) and the thermally resistant synthetic resin of (B) combined, the produced composition is deficient in thermal resistance. If it exceeds 200 parts by weight, the applied layer is deficient in mechanical properties.

Optionally the composition of the present invention may incorporate known additives for the thermally resistant synthetic resin such as curing accelerator and coloring pigment.

An insulated electric wire having an insulating layer of outstanding thermal resistance is obtained by applying to the surface of an electric conductor the polyborosiloxane composition of this invention useful for the formation of an electrically insulating layer and baking the applied layer or wrapping glass fibers on the electric conductor, impregnating the layer of glass fibers with the composition, and baking the impregnated layer of glass fibers.

Examples of the electric conductor suitable for this invention include an Ni-plated copper, an Ag-plated copper, an Ni, and an Ag.

The mechanical properties and the electrical properties at room temperature of the insulated electric wire to be obtained as described above in accordance with this invention can be further improved by further coating the insulated wire with an ordinary wire enamel and baking the applied coat of enamel.

Examples of the wire enamel to be suitably used for the overcoat layer include wire enamels such as polyester, polyester imide, polyimide, polyamideimide, polyamide, polyimidazopyrrolone, formal, polyurethane, and epoxy. They may be effectively used either singly or in the form of a mixture of two or more members. Although the thickness of the overcoat layer is determined by the properties expected of the produced insulated wire, it is desired to be at least 1 micron and not more than twice the thickness of the undercoat layer. This is because the overcoat layer fails to manifest its effect amply when the thickness is less than 1 micron and the undercoat layer fails to manifest its thermal resistance sufficiently when the thickness is more than twice the thickness of the undercoat layer.

The application and baking of the overcoat layer are accomplished by an ordinary method which is followed in the baking of an enameled wire.

The insulated electric wire of this invention which is formed as described above is advantageously used as a refractory cable, for nuclear power generation geothermal power generation which necessitate high resistance to temperatures exceeding 300° C.

Now, the invention will be described with reference to working examples below.

(Preparation of polyborosiloxane (solution) (I))

A flask was charged with 432 g (2 moles) of diphenyldihydroxysilane, 83 g (1.3 moles) of boric acid, and 256 g of dimethyl silicone oil having a viscosity (at 25° C.) of 10 centistokes. In an atmosphere of nitrogen, the reactants were stirred and heated from room temperature to 400° C. over a period of six hours. They were further heated and stirred at 400° C. for one hour to effect polycondensation. During the reaction, 66 g of water and 70 g of unaltered low-molecular silicone oil were removed by distillation. The reaction formed 525 g of a product which was a colorless solid at room temperature.

The reaction product was dissolved in N-methyl-2-pyrolidone to produce a resin solution having an involatile content (250° C.×0.5 hour+300° C.×1 hour) of 45.6%.

(Preparation of polyborosiloxane (solution) (II))

In the same apparatus under the same conditions as used for the production of the polyborosiloxane of (I) described above, 432 g (2 moles) of diphenyldihydroxysilane, 75 g (1.2 moles) of boric acid, and 150 g of phenylmethyl silicone oil having a viscosity (at 25° C.) of 100 centistokes were subjected to polycondensation to afford a colorless, solid product.

This reaction product was dissolved in N-methyl-2-pyrolidone to produce a resin solution having an involatile content (250° C.×0.5 hour+300° C.×1 hour) of 45%.

(Preparation of polyborosiloxane (solution) (comparison))

In the same apparatus under the same conditions as used for the production of the polyborosiloxane of (I) described above, 432 g (2 moles) of diphenylhydroxysilane and 83 g (1.3 moles) of boric acid were subjected to polycondensation to afford a colorless solid product. This reaction product was dissolved in N-methyl-2-pyrolidone to produce a resin solution having an involatile content (250° C.×0.5 hour+300° C.×1 hour) of 45%.

EXAMPLE 1

A polyborosiloxane composition was obtained by mixing 333 g of the polyborosiloxane solution (I) with 300 g of a xylene 50% phenylmethyl silicone resin solution (made by Toshiba Silicone Co., Ltd. and marketed under trademark designation of Toshiba Silicone TSR116), 40 g of a methanol 80% silicone curing agent solution (made by Toshiba Silicone Co., Ltd. and marketed under Trademark Designation of Toshiba Silicone Curing Agent CR12), 120 g of magnesium oxide (MgO), 300 g of N-methyl-2-pyrolidone (solids content ratio of polyborosiloxane:silicone resin:- MgO=50:50:40).

In a vertical baking machine having a furnace length of 7.4 meters, the composition described above was applied six times to an Ni-plated (1.5μ in thickness) copper wire 1.0 mm in diameter under the conditions of 450° C. of baking temperature and 4.0 m/minute of baking speed. The wire coated with the applied layer was subjected to three times of heating without further coating under the conditions of 450° C. of heating temperature and 4.0 m/minute of wire speed to afford an insulated electric wire. The properties of the insulated electric wire are shown in Table 1.

In this table, Comparative Experiment 1 represents the data obtained of an insulated electric wire obtained by following the procedure of Example 1, except that the polyborosiloxane (comparison) was used in place of the polyborosiloxane (solution) (I).

TABLE 1

| | Example 1 | Comparative Experiment 1 |
|---|---|---|
| Thickness of layer (μ) | 30 | 30 |
| Flexibility (d) (times the diameter) | 3 | More than 100 |
| Pencil hardness Initial value | 3H | 3H |
| After 48 hours in water | HB | HB |
| Exposure of electric conductor due to separation of layer after 40 minutes' heating at 600° C. | None | Yes |

EXAMPLES 2-4

By following the procedure of Example 1, compositions were prepared by the blending ratios indicated in Table 2. In a vertical baking furnace having a furnace length of 7.4 m, the compositions obtained were each applied to an Ni-plated (15μ in thickness) soft copper wire 1.0 mm in diameter under the same conditions as those of Example 1. The electric wires coated with applied layers of the compositions were then subjected to heating without further coating. The properties of the produced insulated electric wires were as shown in Table 2.

In this table, Comparative Experiment represents the data obtained of the insulated electric wires using the compositions formed by combining a mixture of the polyborosiloxane solution with the silicone resin solution, the polyborosiloxane solution, and the silicone resin solution respectively with the inorganic filler. They are shown here for the comparison with the present invention.

TABLE 2

| | Example | | | Comparative Experiment | | |
|---|---|---|---|---|---|---|
| | 2 | 3 | 4 | 2 | 3 | 4 |
| Composition*[1] | | | | | | |
| Polyborosiloxane (I) | 40 | | 60 | 50 | | 100 |
| Polyborosiloxane (II) | | 40 | | | | |
| TSR 116*[2] | 60 | 50 | 40 | 50 | 100 | |
| KR 216*[3] | | 10 | | | | |
| Magnesium oxide | 45 | 60 | 20 | | 45 | 45 |
| Mica | | | 4 | | | |
| Electrical properties of wire | | | | | | |
| Thickness of layer (μ) | 30 | 32 | 30 | 27 | 34 | 25 |
| Flexibility (d) | 3 | 5 | 2 | 1 | 3 | More than 10 |
| Pencil hard- Initial value | 3H | 3H | 3H | 4H | 3H | 2B |

TABLE 2-continued

|  |  | Example | | | Comparative Experiment | | |
|---|---|---|---|---|---|---|---|
|  |  | 2 | 3 | 4 | 2 | 3 | 4 |
| ness | After 48 hours in water | HB | 2H | B | 2H | 3H | Less than 6B |
| Exposure of conductor due to separation of layer 40 minutes' heating at 600° C. | | None | None | None | Yes | Yes | None |

*[1]The numerical values given in the block represent weight proportions of resin components.
*[2]A xylene 50% phenylmethyl silicone resin solution, made by Toshiba Silicone Co., Ltd. In Comparative Experiment 2, the solvent xylene of TSR116 was expelled and the resinous component was dissolved in N—methyl-2-pyrolidone.
*[3]A silicone resin made by Shinetsu Silicone Co., Ltd. and used in the form of a 50% solution in N—methyl-2-pirolvdone.

TABLE 3

| | |
|---|---|
| Thickness of layer ($\mu$) | 32 |
| Flexibility (times the diameter) (d) | 2 |
| Thermally softening temperature (°C.) (under load of 700 g, 2° C./minute) | above 600 |

EXAMPLES 6-11

By following the procedure of Example 1, compositions were prepared at the blending ratios shown in Table 4. In a vertical baking machine having a furnace length of 7.4 m, the compositions thus obtained were each applied to an annealed Ni-plated (1.5$\mu$ in thickness) copper wire 1.0 mm in diameter and baked under the conditions shown in the same table. The electric wires coated with the applied layers of the compositions were then subjected to heating without further coating.

TABLE 4

|  | Example | | | | | | Comparative Experiment | |
|---|---|---|---|---|---|---|---|---|
|  | 6 | 7 | 8 | 9 | 10 | 11 | 5 | 6 |
| Composition*[1] | | | | | | | | |
| Polyborosiloxane solution (I) | 80 | 50 | 80 | | 40 | 50 | | |
| Polyborosiloxane solution (II) | | | | 40 | | | | |
| Pire ML | 20 | 50 | 20 | | 40 | 50 | 100 | 100 |
| TVE 5051*[2] | | | | 60 | | | | |
| TSR116 | | | | | 20 | | | |
| MgO | 40 | 20 | 20 | 30 | 40 | 80 | | 40 |
| Mica powder | | | | 5 | | | | |
| Baking conditions | | | | | | | | |
| Baking temperature (°C.) | 450 | 400 | 450 | 450 | 400 | 400 | 330 | 330 |
| Baking speed (m/minute) | 4.0 | 4.0 | 4.0 | 4.0 | 4.0 | 4.0 | 10.0 | 10.0 |
| Number of application | 6 | 6 | 6 | 6 | 6 | 6 | 8 | 6 |
| Heating temperature without further coating (°C.) | None | 450 | None | None | 450 | 400 | None | None |
| Speed of heating without further coating (m/minute) | | 4.0 | | | 4.0 | 4.0 | | |
| Number of heating without further coating | | 6 | | | 4 | 6 | | |

*[1]The numerical values given in the block represent weight proportions of resin components.
*[2]A cresol-soluble aromatic polyimide resin made by Toshiba Chemical Co., Ltd.

EXAMPLE 5

A composition was obtained by mixing 168 g of the polyborosiloxane solution (I) with 510 g of an N-methyl-2-pyrolidone solution (having an involatile content of 15.0% (250° C.×0.5 hour+300° C.×1 hour) (produced by E. I. du Pont of the U.S., and marketed under the trademark designation of Pire ML), 61 g of magnesium oxide (MgO), and 195 g of N-methyl-2-pyrolidone (Solids content ratio of polyborosiloxane:Pire ML:MgO=50:50:40).

In a vertical baking machine having a furnace length of 7.4 m, the aforementioned composition was applied six times to an Ni-plated (1.5$\mu$ in thickness) copper wire 1.0 mm in diameter under the conditions of 400° C. of baking temperature and 4.0 m/minute of baking speed. The electric wire coated with the applied layer of the composition was further subjected to heating without further coating six times under the conditions of 450° C. of heating temperature and 4.0 m/minute of wire speed. The properties of the insulated electric wire thus obtained were as shown in Table 3.

Comparative Experiments represent the data obtained of the composition produced by using the thermally resistant synthetic resin solution alone and the composition produced by mixing this solution with the inorganic filler. They are shown herein for the comparison with the present invention.

The properties of the insulated electric wires produced were as shown in Table 5.

TABLE 5

| Properties | Example | | | | | | Comparative Experiment | |
|---|---|---|---|---|---|---|---|---|
| | 6 | 7 | 8 | 9 | 10 | 11 | 5 | 6 |
| Thickness of layer ($\mu$) | 40 | 30 | 31 | 30 | 33 | 30 | 30 | 29 |
| Flexibility (d) | 4 | 1 | 3 | 1 | 1 | 5 | 1 | 1 |
| Thermally softening temperature (°C.) | above 600 | | | | | | 500 | 530 |

EXAMPLE 12

A composition having an involatile content of 50% was obtained by mixing 333 g of the polyborosiloxane solution (I) with 300 g of Toshiba Silicone TSR116, 40 g of Toshiba Silicone Curing Agent CR 12, 90 g of magnesium oxide, 30 g of mica, and about 90 g of N-methyl-2-pyrolidone (solids content ratio of polyborosiloxane:silicone resin:inorganic filler=50:50:40).

In a vertical baking machine having a furnace length of 7.4 m, the composition described above was applied six times to an Ni-plated (1.5μ in thickness) copper wire 1.0 mm in thickness under the conditions of 450° C. of baking temperature and 4.0 m/minute of baking speed and baked. Further the electric wire coated with the applied layer of the composition was subjected to heating without further coating six times under the conditions of 450° C. of heating without further coating temperature and 4.0 m/minute of wire speed.

To the applied layer of the composition of the electric wire, a polyamideimide varnish (made by Hitachi Ltd., and marketed under the trademark designation of HI400) was applied twice and baked under the conditions of 400° C. of baking temperature and 8.0 m/minute of baking speed, to afford an insulated electric wire of the present invention. The electric wire thus produced was tested for properties. The results were as shown in Table 6.

EXAMPLE 13

A composition formed of polyborosiloxane (I), a silicone resin (Toshiba Silicone TSR117), magnesium oxide, and mica at a solids content ratio of 45:55:30:10 and having an involatile content of 50% was prepared. This composition was applied and baked under the same conditions as those of Example 12, to produce an undercoat layer. To this undercoat layer, Pire ML was applied twice and baked under the conditions of 400° C. of baking temperature and 8 m/minute of baking speed, to afford an insulated electric wire of the present invention. The properties of the insulated electric wire were as shown in Table 6.

EXAMPLE 14

A composition formed of polyborosiloxane (II), a silicone resin (Toshiba Silicone TSR116), and magnesium oxide at a solids content ratio of 40:60:40 and having an involatile content of 50% was prepared. Under the same conditions as those of Example 12, the composition was applied and baked, to produce an undercoat layer. To this undercoat layer, a polyester imide varnish (made by Nisshoku-Schenectady Corp, and marketed under the trademark designation of Isomide) was applied twice and baked under the conditions of 400° C. of baking temperature and 8 m/minute of baking speed, to afford an insulated electric wire of this invention. The properties of the insulated electric wire were as shown in Table 6.

In the table, Comparative Experiments represent the data obtained of electric wire provided with no overcoat layer. They are inserted for the purpose of comparison with the present invention.

TABLE 6

|  | Example 12 | Comparative Experiment 7 | Example 13 | Comparative Experiment 8 | Example 14 | Comparative Experiment 9 |
| --- | --- | --- | --- | --- | --- | --- |
| Thickness of layer (μ) | 32 | 28 | 30 | 25 | 32 | 27 |
| Diameter of coated cable (d) | 3 | 3 | 5 | 5 | 5 | 5 |
| Breakdown voltage (V) | 2700 | 1500 | 4000 | 1000 | 2000 | 800 |
| Wear resistance (number of strokes) (under 200 g of load) | 43 | 12 | 40 | 9 | 30 | 8 |
| Resistance to solvent (loss of rigidity of layer after 24 hours in xylene) | None | Yes | None | Yes | None | Yes |
| Breakdown voltage (V) after one hour's heating at 600° C. | 400 | 400 | 500 | 500 | 600 | 600 |

EXAMPLE 15

To the insulated electric wire obtained in Example 5, Pire ML was coated twice and baked under the conditions of 400° C. of baking temperature and 8.0 m/minute of baking speed, to afford an insulated electric wire of the present invention. The properties of the insulated electric wire were as shown in Table 7.

EXAMPLE 16

To the insulated electric wire obtained in Example 6, a polyamideimide varnish (made by Hitachi Ltd. and marketed under the trademark designation of HI400) was applied twice and baked under the conditions of 400° C. of baking temperature and 8 m/minute of baking speed, to afford an insulated electric wire of the present invention. The properties of the insulated electric wire were as shown in Table 7.

EXAMPLE 17

To the insulated electric wire obtained in Example 11, a polyester imide varnish (made by Nisshoku-Schenectady Corp. and marketed under the trademark designation of Isomide) was applied twice and baked under the conditions of 400° C. of baking temperature and 8 m/minute of baking speed, to afford an insulated electric wire of the present invention. The properties of the insulated electric wire were as shown in Table 7.

TABLE 7

|  | Example 15 | Example 16 | Example 17 |
| --- | --- | --- | --- |
| Thickness of layer (μ) | 37 | 44 | 35 |
| Diameter of coated wire (d) | 3 | 5 | 5 |
| Breakdown voltage (V) | 5000 | 1700 | 2400 |
| Wear resistance (number of strokes) (under 200 g of load) | 71 | 20 | 43 |
| Pencil hardness | 6H | 2H | 3H |
| Resistance to solvent (pencil hardness after 24 hours in xylene) | 6H | 2H | 3H |

TABLE 7-continued

|  | Example 15 | Example 16 | Example 17 |
|---|---|---|---|
| Thermally softening temperature (°C.) (under 700 g of load, 2° C./minute) | above | — | — |

What is claimed is:

1. A polyborosiloxane composition for the production of an electrically insulating layer on a conductor surface, which composition comprises:
   (A) a polyborosiloxane obtained by the polycondensation reaction at a temperature of 50° to 800° C. of
      (1) at least one boron compound selected from the group consisting of boric acids, boric anhydride, metallic salts of boric acid, halogenated borons, and boric esters,
      (2) at least one silane compound selected from the group consisting of silane compounds represented by the general formulas, $SiX_4$, $SiRX_3$, and $SiRR'X_2$ (wherein, R and R' each denote a methyl group or a phenyl group, and X denotes a hydroxyl group (providing that, in $SiX_4$, at least one of the X's is a halogen atom), or a halogen atom, providing that where X is a hydroxyl group, a dehydration condensate is embraced), and
      (3) at least one silicone oil selected from the group consisting of dimethyl silicone oil and phenyl methyl silicone oil having a viscosity of at least 1.0 centistoke at 25° C.,
   (B) at least one thermally resistant synthetic resin selected from the group consisting of silicone resins and synthetic resins containing a nitrogen-containing heterocyclic ring,
   (C) an inorganic filler, and
   (D) a common solvent for (A) the polyborosiloxane and (B) the thermally resistant synthetic resin.

2. A polyborosiloxane composition according to claim 1, wherein the viscosity of the silicone oil is at least 10 centistokes at 25° C.

3. A polyborosiloxane composition according to claim 1, wherein the silicone oil is represented by the general formula:

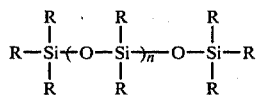

(wherein, R denotes a methyl group or phenyl group and n an integer of the value of 0 to 2300).

4. A polyborosiloxane composition according to claim 1, wherein the synthetic resin having a nitrogen-containing heterocyclic ring is formed of at least one member selected from the group consisting of polyimide, polyamideimide, and polyimidazopyrrolone.

5. An insulated electric wire characterized by having a thin electrically insulating layer of a polyborosiloxane composition comprising:
   (A) a polyborosiloxane obtained by the polycondensation reaction at a temperature of 50° to 800° C. of
      (1) at least one boron compound selected from the group consisting of boric acids, boric anhydride, metallic salts of boric acid, halogenated borons, and boric esters,
      (2) at least one silane compound selected from the group consisting of silane compounds represented by the general formulas, $SiX_4$, $SiRX_3$, and $SiRR'X_2$ (wherein, R and R' each denote a methyl group or a phenyl group, and X denotes a hydroxyl group (providing that, in $SiX_4$, at least one of the X's is a halogen atom), or a halogen atom, providing that where X is a hydroxyl group, a dehydration condensate is embraced), and
      (3) at least one silicone oil selected from the group consisting of dimethyl silicone oil and phenyl methyl silicone oil having a viscosity of at least 1.0 centistoke at 25° C.,
   (B) at least one thermally resistant synthetic resin selected from the group consisting of silicone resins and synthetic resins containing a nitrogen-containing heterocyclic ring, and
   (C) an inorganic filler.

6. An insulated electric wire, comprising:
an electric conductor,
a thin electrically insulating layer formed, in intimate contact with said electric conductor, of a polyborosiloxane composition comprising:
   (A) a polyborosiloxane obtained by the polycondensation reation at a temperature of 50° to 800° C. of
      (1) at least one boron compound selected from the group consisting of boric acids, boric anhydride, metallic salts of boric acid, halogenated borons, and boric esters,
      (2) at least one silane compound selected from the group consisting of silane compounds represented by the general formulas, $SiX_4$, $SiRX_3$, and $SiRR'X_2$ (wherein, R and R' each denote a methyl group or a phenyl group, and X denotes a hydroxyl group (providing that, in $SiX_4$, at least one of the X's is a halogen atom), or a halogen atom, providing that where X is a hydroxyl group, a dehydration condensate is embraced), and
      (3) at least one silicone oil selected from the group consisting of dimethyl silicone oil and phenyl methyl silicone oil having a viscosity of at least 1.0 centistoke at 25° C.,
   (B) at least one thermally resistant synthetic resin selected from the group consisting of silicone resins and synthetic resins containing a nitrogen-containing heterocyclic ring,
   (C) an inorganic filler,
and an additional electrically insulating layer formed, on said electrically insulating layer, of at least one resin selected from the group consisting of polyester, polyester imide, polyimide, polyamideimide, polyamide, polyimidazopyrrolone, formal, polyurethane, and epoxy.

* * * * *